United States Patent
Chen

(10) Patent No.: US 11,623,323 B2
(45) Date of Patent: Apr. 11, 2023

(54) METHOD FOR DETECTING, CONTROLLING AND AUTOMATICALLY COMPENSATING PRESSURE IN A POLISHING PROCESS

(71) Applicant: Tung Hung Automation Investment Limited, Kowloon (HK)

(72) Inventor: Yong Qiang Chen, Kowloon (HK)

(73) Assignee: TUNG HUNG AUTOMATION INVESTMENT LIMITED, Hong Kong (CN)

( * ) Notice: Subject to any disclaimer, the term of this patent is extended or adjusted under 35 U.S.C. 154(b) by 334 days.

(21) Appl. No.: 16/094,094

(22) PCT Filed: Oct. 18, 2017

(86) PCT No.: PCT/IB2017/056458
§ 371 (c)(1),
(2) Date: Oct. 16, 2018

(87) PCT Pub. No.: WO2018/091989
PCT Pub. Date: May 24, 2018

(65) Prior Publication Data
US 2019/0126433 A1 May 2, 2019

(30) Foreign Application Priority Data
Nov. 18, 2016 (HK) .................................. 16113260.8

(51) Int. Cl.
*B24B 49/16* (2006.01)
*B24B 49/00* (2012.01)

(52) U.S. Cl.
CPC .............. *B24B 49/16* (2013.01); *B24B 49/00* (2013.01)

(58) Field of Classification Search
CPC ......... B24B 49/00; B24B 49/16; B24B 27/00; B24B 47/00; B24B 5/18; B24B 5/22;
(Continued)

(56) References Cited

U.S. PATENT DOCUMENTS 5,827,111 A * 10/1998 Ball ........................ B24B 7/228
451/14
5,951,368 A * 9/1999 Watanabe ............. F16C 32/044
451/10
(Continued)

FOREIGN PATENT DOCUMENTS

| CN | 101011813 A | 8/2007 |
| CN | 103158035 A | 6/2013 |

(Continued)

OTHER PUBLICATIONS

NPL1, Multi-Axis Force/Torque Sensors, Available Jul. 10, 2015, ATI Industrial Automation, https://www.ati-ia.com/products/ft/sensors.aspx (Year: 2015).*

*Primary Examiner* — Joel D Crandall
*Assistant Examiner* — Michael A Gump
(74) *Attorney, Agent, or Firm* — Muncy, Geissler, Olds & Lowe, P.C.

(57) ABSTRACT

The invention relates to a method for detecting, controlling and automatically compensating pressure in a polishing process, including: detecting a pressure between a polishing wheel and a polished workpiece by a detection shaft or a moment generated on the detection shaft, and outputting the detected pressure or moment to a controller; comparing the detected pressure or moment with a preset pressure or moment and determining whether there is a difference between them; calculating a compensation feeding amount based on the difference and outputting an adjustment signal to an adjustment shaft based on the compensation feeding amount; and moving the adjustment shaft correspondingly (Continued)

based on the adjustment signal so as to drive the polishing wheel or the polished workpiece to move correspondingly to adjust a relative position between the polishing wheel and the polished workpiece so that the difference keeps consistent.

14 Claims, 5 Drawing Sheets

(58) Field of Classification Search
CPC ........... B24B 5/225; B24B 5/30; B24B 5/307; B24B 47/206; G05B 2219/45161; G05B 2219/45199; G05B 19/18; G01L 1/26
USPC ........................................ 451/5, 11; 700/164
See application file for complete search history.

(56) References Cited

U.S. PATENT DOCUMENTS

| | | | |
|---|---|---|---|
| 2003/0003847 A1* | 1/2003 | Yi | ........................... B24B 41/04 451/9 |
| 2012/0191235 A1 | 7/2012 | Shin et al. | |
| 2015/0133034 A1* | 5/2015 | Luthi | ...................... B24B 49/00 451/11 |

FOREIGN PATENT DOCUMENTS

| | | |
|---|---|---|
| CN | 103885334 A | 6/2014 |
| CN | 105690209 A | 6/2016 |
| CN | 105729305 A | 7/2016 |
| CN | 106553126 A | 4/2017 |

* cited by examiner

METHOD FOR DETECTING, CONTROLLING AND AUTOMATICALLY COMPENSATING PRESSURE IN A POLISHING PROCESS

FIELD OF INVENTION

The present invention relates to a method for detecting, controlling and automatically compensating pressure in a polishing process of polishing equipment.

BACKGROUND

In the manufacturing process, there is a large demand for polishing of workpieces, ranging from large aerospace components and automotive molds to small decorative pieces, including military products, industrial products, and civilian products. In a polishing process, the factors affecting machining quality include: the straight pressure between the grinding wheel and the workpiece, the running speed of the grinding wheel when it contacts the workpiece, the material characteristics of the grinding wheel and the workpiece, the machining process and appropriate process parameters, the consistency of the original workpiece, and the stability of the machining equipment. Obviously, the key is to keep the straight pressure between the grinding wheel and the workpiece, and the running speed of the grinding wheel when it contacts the workpiece constant in the machining process. Stable pressure and speed can make the machining quality of workpieces stable and consistent, appropriate pressure and speed can assure the accuracy and efficiency of machining.

Currently, workpieces are polished mostly by manual operation of polishing equipment. The working environment is harsh, the labor intensity is high, there are the hazards of deflagration and human injury sometimes, and in most cases, the requirements for machining accuracy, stable quality and high efficiency cannot be met, mainly because manual operation is unable to control the detection and automatic control and compensation of the pressure between the grinding wheel and the workpiece.

On the market, there is also some automatic polishing equipment. It adjusts the pressure between a grinding wheel and a workpiece mainly by detecting the feedback current of the motor frequency converter of the grinding wheel. It has the following major defects: (1) The current of the grinding wheel motor is not an independent variable reflecting the pressure between the grinding wheel and the workpiece. This variable has a great correlation with the characteristics of the grinding wheel (such as the mass uniformity, dynamic balance characteristics and roundness of the grinding wheel, and the disturbance of the cantilever mechanism). (2) As the grinding wheel adopts control by frequency converter, the rotation speed of the grinding wheel motor is changed (reduced) on the moment when the grinding wheel contacts the workpiece (i.e., pressure is generated between them). The frequency converter will automatically adjust frequency, voltage and current to raise the rotation speed of the motor. The current of the motor at this moment alone is unable to reflect the pressure between the workpiece and the grinding wheel, so it is obviously wrong, at least not appropriate, to use it as a target variable to control pressure.

SUMMARY OF INVENTION

The object of the present invention is to overcome the foregoing helplessness and inability of manual labor and the defects of the prior art, and provide a method for detecting, controlling and automatically compensating pressure in a polishing process, which may realize the detection, control and automatic compensation of the pressure between a grinding wheel and a workpiece in a polishing process, and meets the requirements for accuracy, machining quality stability and consistency, and efficient operation.

The method provided by the present invention for detecting, controlling and automatically compensating pressure in a polishing process comprises the following steps:

detecting a pressure between a polishing wheel and a polished workpiece by a detection shaft or detecting a moment generated on the detection shaft by the pressure between the polishing wheel and the polished workpiece, and outputting the detected pressure or moment to a controller;

comparing by the controller the pressure or moment detected by the detection shaft with a preset pressure or moment and determining whether there is a difference between them, and if there is not a difference, repeating the last step, or if there is a difference, carrying out the next step;

calculating by the controller a compensation feeding amount based on the difference and outputting an adjustment signal to an adjustment shaft based on the compensation feeding amount;

moving the adjustment shaft correspondingly based on the adjustment signal so as to drive the polishing wheel or the polished workpiece to move correspondingly to adjust a relative position between the polishing wheel and the polished workpiece so that the pressure between the polishing wheel and the polished workpiece or the moment generated on the detection shaft by the pressure between the polishing wheel and the polished workpiece tends to be and keeps consistent with the preset pressure or moment; and in the polishing process, continuous repeating the foregoing steps to keep the pressure between the polishing wheel and the polished workpiece constant all the time. Further, the difference includes a positive difference and a negative difference. Further, the polishing wheel is fixed to the detection shaft, and the detection shaft is fixed to the adjustment shaft.

Further, if the controller determines that there is a positive difference between them, it will calculate a negative compensation feeding amount based on the positive difference, and output an adjustment signal to the adjustment shaft based on the calculated negative compensation feeding amount, and the adjustment shaft will move away from the polished workpiece based on the adjustment signal so as to drive the polishing wheel to move away from the polished workpiece to adjust a relative position between the polishing wheel and the polished workpiece.

Further, if the controller determines that there is a negative difference between them, it will calculate a positive compensation feeding amount based on the negative difference, and output an adjustment signal to the adjustment shaft based on the calculated positive compensation feeding amount, and the adjustment shaft will move towards the polished workpiece based on the adjustment signal so as to drive the polishing wheel to move towards the polished workpiece to adjust a relative position between the polishing wheel and the polished workpiece.

Further, the polishing wheel is fixed to the detection shaft, and the polished workpiece is fixed to the adjustment shaft.

Further, if the controller determines that there is a positive difference between them, it will calculate a negative compensation feeding amount based on the positive difference, and output an adjustment signal to the adjustment shaft based on the calculated negative compensation feeding amount, and the adjustment shaft will move away from the polishing wheel based on the adjustment signal so as to drive the polished workpiece to move away from the polishing wheel to adjust a relative position between the polishing wheel and the polished workpiece.

Further, if the controller determines that there is a negative difference between them, it will calculate a positive compensation feeding amount based on the negative difference, and output an adjustment signal to the adjustment shaft based on the calculated positive compensation feeding amount, and the adjustment shaft will move towards the polishing wheel based on the adjustment signal so as to drive the polished workpiece to move towards the polishing wheel to adjust a relative position between the polishing wheel and the polished workpiece.

Further, the polishing wheel is fixed to the adjustment shaft, and the polished workpiece is fixed to the detection shaft.

Further, if the controller determines that there is a positive difference between them, it will calculate a negative compensation feeding amount based on the positive difference, and output an adjustment signal to the adjustment shaft based on the calculated negative compensation feeding amount, and the adjustment shaft will move away from the polished workpiece based on the adjustment signal so as to drive the polishing wheel to move away from the polished workpiece to adjust a relative position between the polishing wheel and the polished workpiece.

Further, if the controller determines that there is a negative difference between them, it will calculate a positive compensation feeding amount based on the negative difference, and output an adjustment signal to the adjustment shaft based on the calculated positive compensation feeding amount, and the adjustment shaft will move towards the polished workpiece based on the adjustment signal so as to drive the polishing wheel to move towards the polished workpiece to adjust a relative position between the polishing wheel and the polished workpiece.

Further, the polished workpiece is fixed to the detection shaft, and the detection shaft is fixed to the adjustment shaft.

Further, if the controller determines that there is a positive difference between them, it will calculate a negative compensation feeding amount based on the positive difference, and output an adjustment signal to the adjustment shaft based on the calculated negative compensation feeding amount, and the adjustment shaft will move away from the polishing wheel based on the adjustment signal so as to drive the polished workpiece to move away from the polishing wheel to adjust a relative position between the polishing wheel and the polished workpiece.

Further, if the controller determines that there is a negative difference between them, it will calculate a positive compensation feeding amount based on the negative difference, and output an adjustment signal to the adjustment shaft based on the calculated positive compensation feeding amount, and the adjustment shaft will move towards the polishing wheel based on the adjustment signal so as to drive the polished workpiece to move towards the polishing wheel to adjust a relative position between the polishing wheel and the polished workpiece.

Further, the detection shaft comprises a sensor, which is a force sensor or a moment sensor.

The present invention uses a detection shaft to detect a pressure between a polishing wheel and a polished workpiece or detect a moment generated on the detection shaft by a pressure between a polishing wheel and a polished workpiece, uses a controller to control pressure or moment and uses an adjustment shaft to automatically compensate the pressure between the polishing wheel and the polished workpiece. When the rotation speed of the polishing wheel is constant, the present invention realizes stable pressure between the polishing wheel and the polished workpiece in the polishing process and may also realize automatic compensation in the polishing process when the polishing wheel is worn, thereby guaranteeing stable and consistent machining quality of polished workpieces and meeting the requirements for high accuracy and high efficiency.

DETAILED DESCRIPTION OF PREFERRED EMBODIMENTS

Below the present invention is further described by referring to the accompanying drawings and embodiments.

Figure 1:
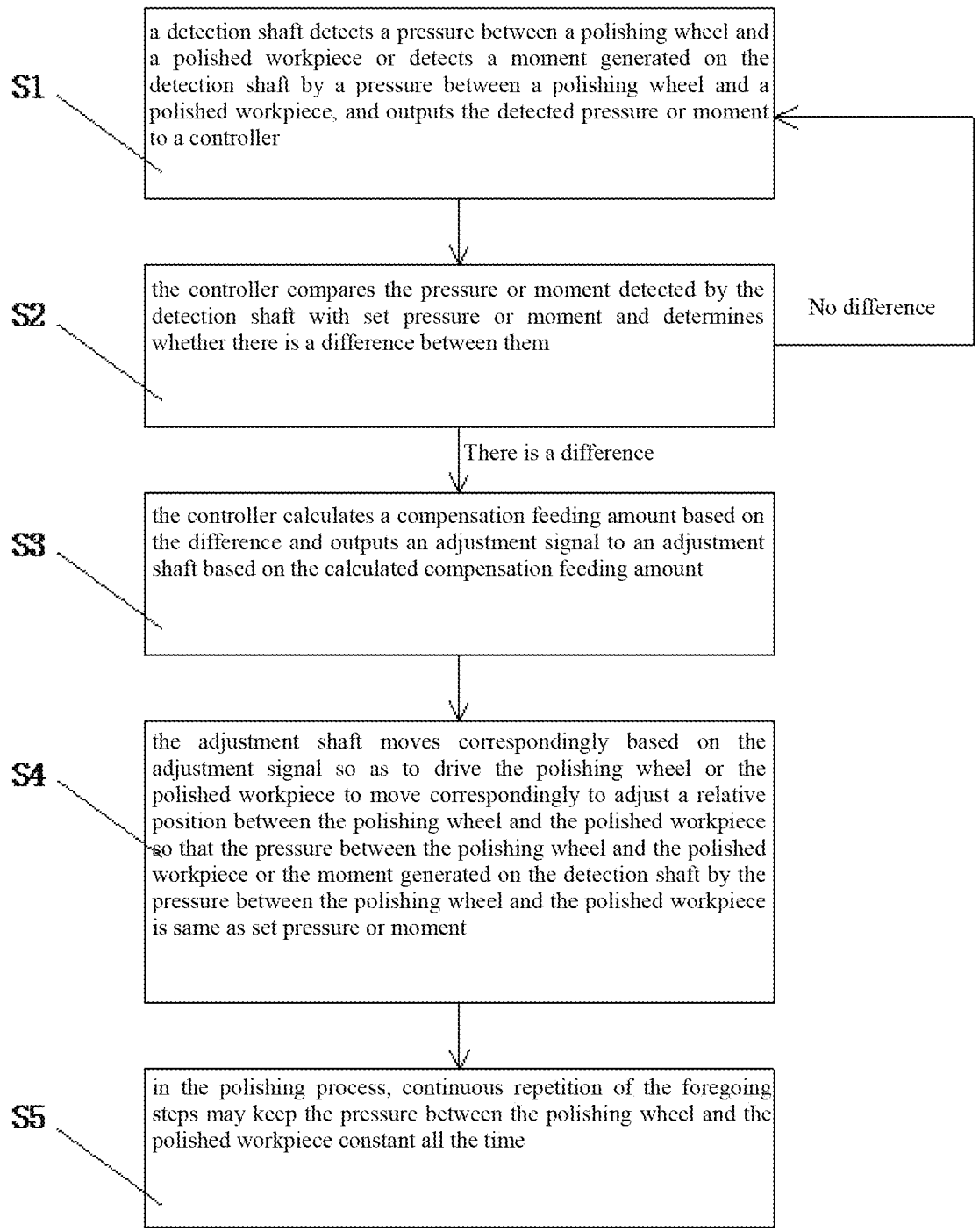
FIG. 1 is a flow diagram of a method provided by the present invention for detecting, controlling and automatically compensating pressure in a polishing process.

As shown in FIG. 1, the method provided by the present invention for detecting and automatically controlling and compensating pressure in a polishing process comprises the following steps:

S1: A detection shaft detects a pressure between a polishing wheel and a polished workpiece or detects a moment generated on the detection shaft by the pressure between the polishing wheel and the polished workpiece, and outputs the detected pressure or moment to a controller. The controller may be a PLC controller, a PID controller, a fuzzy controller or any other controller. In this embodiment, the controller is a PLC controller.

S2: The controller compares the pressure or moment detected by the detection shaft with the preset pressure or moment and determines whether there is a difference between them, and if there is not a difference, the last step will be repeated, or if there is a difference, the next step will be carried out. The difference includes positive difference and negative difference.

S3: The controller calculates a compensation feeding amount based on the difference and outputs an adjustment signal to an adjustment shaft based on the compensation feeding amount.

S4: The adjustment shaft moves correspondingly based on the adjustment signal so as to drive the polishing wheel or the polished workpiece to move correspondingly to adjust a relative position between the polishing wheel and the polished workpiece so that the pressure between the polishing wheel and the polished workpiece or the moment generated on the detection shaft by the pressure between the polishing wheel and the polished workpiece tends to be and keeps consistent with the preset pressure or moment.

S5: In the polishing process, continuous repetition of the foregoing steps may keep the pressure between the polishing wheel and the polished workpiece constant all the time.

The method provided by the present invention for detecting, controlling and automatically compensating pressure in a polishing process is applicable to the polishing of various kinds of standard and irregular workpieces such as cellphones, watches, pots, tableware, sanitary ware and molds. It has a high degree of automation and may save a lot of manual labor and significantly improve the working environment and work intensity of operators. The machining quality of the workpieces is stable and consistent and the machining efficiency is raised.

Below the method provided by the present invention for detecting, controlling and automatically compensating pressure in a polishing process is described in detail.

Embodiment 1

Figure 2:
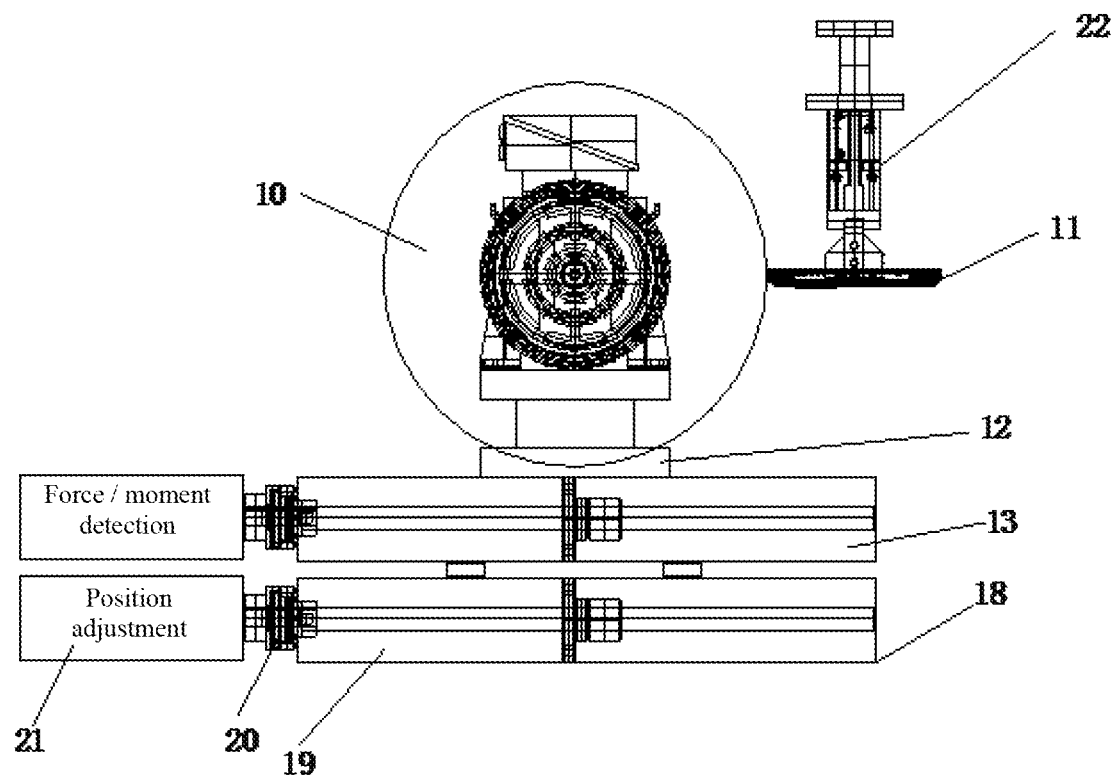
FIG. 2 is a schematic view of the positions of a polishing wheel, a detection shaft, an adjustment shaft and a polished workpiece provided by the first embodiment of the present invention.

As shown in FIG. 2, in this embodiment, a substrate 12 of a polishing wheel 10 is fixed to a detection shaft 13 to make the center of the detection shaft 13 on a same vertical line with the center of the substrate 12, and on a same vertical plane with the center of the polishing wheel 10, in other words, the polishing wheel 10 is fixed to the detection shaft. The polishing wheel 10 may be a grinding wheel. A polished workpiece 11 is fixed to a polishing position 22 to make the center of the polished workpiece 11 on a same horizontal line with the center of the polishing wheel 10. An adjustment shaft 18 is fixed to a detection shaft 13. The adjustment shaft 18 comprises a body 19, a coupling 20 arranged on the body 19 and a driver 21 fixed to the coupling 20. The driver 21 receives an adjustment signal outputted by a controller and drives the body 19 to move correspondingly.

Figure 3:
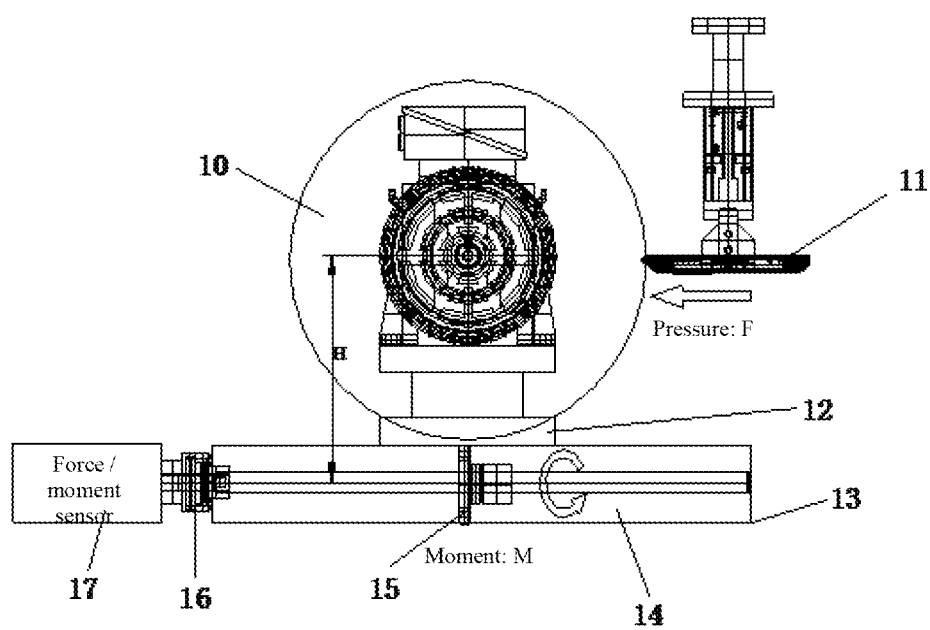
FIG. 3 is a schematic view of pressure detection of the detection shaft shown in FIG. 2.

As shown in FIG. 3, the detection shaft 13 comprises a body 14, a lead screw 15, a coupling 16 and a sensor 17. One end of the lead screw 15 is mounted to the middle part of the body 14, and the other end is mounted to the middle part of the bottom of a substrate 12. The coupling 16 is mounted to the body 14, and the sensor 17 is mounted on the coupling 16. The sensor 17 is a force sensor. Of course, the sensor 17 can be a moment sensor, too. The detection shaft 13 detects a pressure between a polishing wheel 10 and a polished workpiece 11 or detects a moment generated on the detection shaft by the pressure between a polishing wheel 10 and a polished workpiece 11 according to the following principle: When a polished workpiece 11 contacts a polishing wheel 10, a pressure F will be generated. According to the lever principle, a same force F or moment M will be generated on the detection shaft 13. A force sensor or moment sensor may detect the force F or moment M. Moment M is calculated by the following method: supposing the vertical distance from the contact point between the polishing wheel 10 and the polished workpiece 11 to the center of the detection shaft 13 is H, then moment M=F×H. By applying the lever principle, the detection shaft 13 can detect the pressure between the polishing wheel 10 and the polished workpiece 11 or detect the moment generated on the detection shaft 13 by the pressure between the polishing wheel 10 and the polished workpiece 11. Apparently, the moment detection is more accurate and the response speed is higher.

Figure 4:
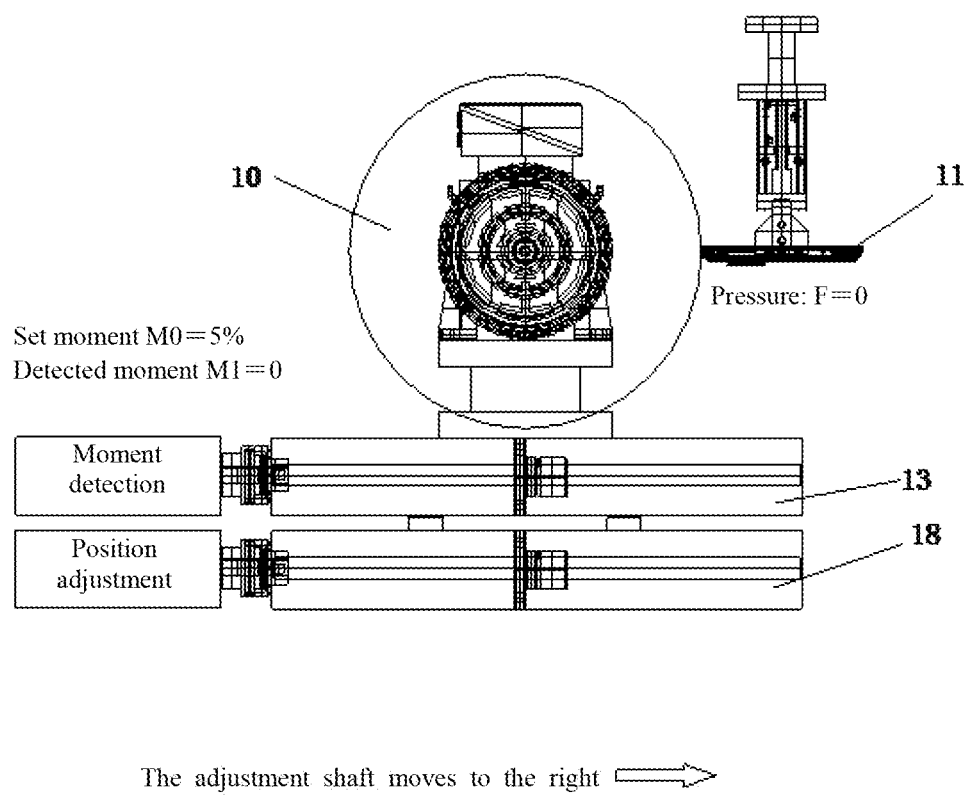
FIG. 4 is a schematic view of movement when the difference between the moment detected by the detection shaft shown in FIG. 2 and the preset moment is a negative difference.

As shown in FIG. 4, a detection shaft's 13 detection of a moment generated on the detection shaft 13 by a pressure between a polishing wheel 10 and a polished workpiece 11 is taken as example. Supposing the preset moment M0 is 5%, and the pressure F between a polishing wheel 10 and a polished workpiece 11 before contact is 0, then according to pressure F=0, the detection shaft 13 detects that the moment M1 generated on the detection shaft 13 by the pressure between the polishing wheel 10 and the polished workpiece 11 is 0. The controller compares moment M1=0 detected by the detection shaft 13 with a preset moment M0=5%, and determines that there is a negative difference between them, so the controller calculates a positive compensation feeding amount based on the negative difference, and outputs an adjustment signal to the adjustment shaft 18 based on the calculated positive compensation feeding amount, and the adjustment shaft 18 moves towards the polished workpiece 11 based on the adjustment signal so as to drive the polishing wheel 10 to move towards the polished workpiece 11 to adjust a relative position between the polishing wheel 10 and the polished workpiece 11. In the process when the adjustment shaft 18 drives the polishing wheel 10 to move, the pressure F between the polishing wheel 10 and the polished workpiece 11 increases gradually, and the actual moment M1 generated by this pressure F on the detection shaft 13 increases gradually until it reaches the preset moment M0, i.e., moment M1 reaches 5%.

Supposing the detection shaft 13 detects that the moment M2 generated on the detection shaft 13 by pressure F between a polishing wheel 10 and a polished workpiece 11 is 2%, the controller compares moment M2=2% detected by the detection shaft 13 with a preset moment M0=5% and determines that there is a negative difference between them, so the controller continues to calculate a positive compensation feeding amount based on the negative difference, and continues to output an adjustment signal to the adjustment shaft 18 based on the calculated positive compensation feeding amount, and the adjustment shaft 18 continues to move towards the polished workpiece 11 based on the adjustment signal so as to drive the polishing wheel 10 to continue to move towards the polished workpiece 11 to adjust a relative position between the polishing wheel 10 and the polished workpiece 11 until the moment M2 generated on the detection shaft 13 by pressure F between the polishing wheel 10 and the polished workpiece 11 is same as the preset moment M0, i.e., moment M2 reaches 5%.

Figure 5:
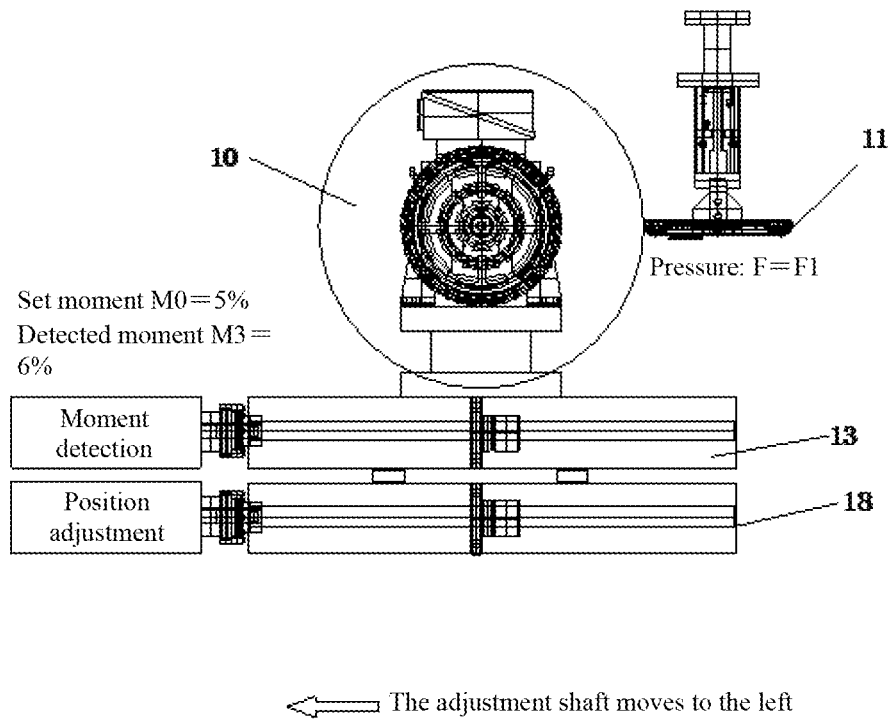
FIG. 5 is a schematic view of movement when the difference between the moment detected by the detection shaft shown in FIG. 2 and the preset moment is a positive difference.

As shown in FIG. 5, still supposing the preset moment M0 is 5%, and pressure F between a polishing wheel 10 and a polished workpiece 11 in the polishing process is F1, then according to pressure F=F1, the detection shaft 13 detects that the moment M3 generated on the detection shaft 13 by the pressure F1 between the polishing wheel 10 and the polished workpiece 11 is 6%. The controller compares moment M3=6% detected by the detection shaft 13 with a preset moment M0=5% and determines that there is a positive difference between them, so the controller calculates a negative compensation feeding amount based on the positive difference, and outputs an adjustment signal to the adjustment shaft 18 based on the calculated negative compensation feeding amount, and the adjustment shaft 18 moves away from the polished workpiece 11 based on the adjustment signal so as to drive the polishing wheel 10 to move away from the polished workpiece 11 to adjust a relative position between the polishing wheel 10 and the polished workpiece 11. In the process when the adjustment shaft 18 drives the polishing wheel 10 to move, the pressure F1 between the polishing wheel 10 and the polished workpiece 11 decreases gradually, and the moment M3 generated by this pressure F1 on the detection shaft 13 decreases gradually until it reaches the preset moment M0, i.e., moment M3 reaches 5%.

When the pressure between a polishing wheel 10 and a polished workpiece 11 fluctuates, the moment generated on the detection shaft 13 by the pressure between a polishing wheel 10 and a polished workpiece 11 will fluctuate, too. It is supposed that after the foregoing pressure between a polishing wheel 10 and a polished workpiece 11 is adjusted, the pressure between the polishing wheel 10 and the polished workpiece 11 fluctuates and becomes F2, and the detection shaft 13 detects that the moment M4 generated on the detection shaft 13 by the pressure F2 between the polishing wheel 10 and the polished workpiece 11 is 4%. The controller compares moment M4=4% detected by the detection shaft 13 with a preset moment M0=5% and determines that there is a negative difference between them, so the controller calculates a positive compensation feeding amount based on the negative difference, and outputs an adjustment signal to the adjustment shaft 18 based on the calculated positive compensation feeding amount, and the adjustment shaft 18 moves towards the polished workpiece 11 based on the adjustment signal so as to drive the polishing wheel 10 to move towards the polished workpiece 11 to adjust a relative position between the polishing wheel 10 and the polished workpiece 11 until the moment M4 generated on the detection shaft 13 by the pressure F2 between the polishing wheel 10 and the polished workpiece 11 is same as the preset moment M0, i.e., moment M4 reaches 5%.

In the polishing process, continuous repetition of the foregoing steps may keep the moment generated on the detection shaft 13 by the pressure between the polishing wheel 10 and the polished workpiece 11 same as the preset moment all the time, in other words, keep the pressure between the polishing wheel 10 and the polished workpiece 11 constant.

Embodiment 2

Figure 6:
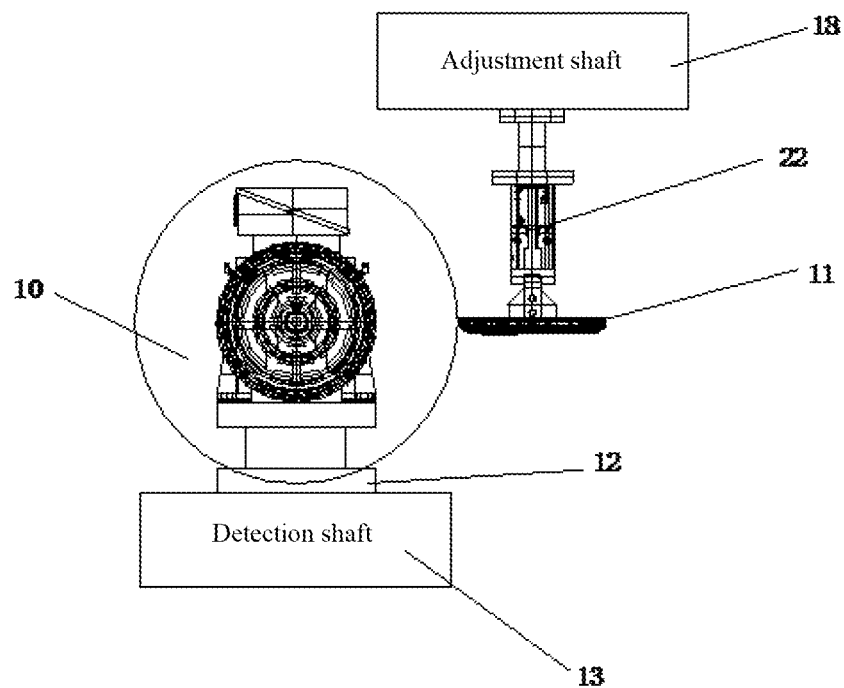
FIG. 6 is a schematic view of the positions of a polishing wheel, a detection shaft, an adjustment shaft and a polished workpiece provided by the second embodiment of the present invention.

As shown in FIG. 6, this embodiment has the following difference from the first embodiment: a polishing position 22 is fixed to an adjustment shaft 18, i.e., a polished workpiece 11 is fixed to an adjustment shaft 18. Below it is illustrated in two examples. The first, the difference determined by the controller is a positive difference, and the second, the difference determined by the controller is a negative difference.

Still a detection shaft's 13 detection of a moment generated on the detection shaft 13 by a pressure between a polishing wheel 10 and a polished workpiece 11 is taken as example. Supposing the preset moment M0 is 5%, and the pressure F between a polishing wheel 10 and a polished workpiece 11 before contact is 0, then according to pressure F=0, the detection shaft 13 detects that the moment M1 generated on the detection shaft 13 by the pressure between the polishing wheel 10 and the polished workpiece 11 is 0. The controller compares moment M1=0 detected by the detection shaft 13 with a preset moment M0=5%, and determines that there is a negative difference between them, so the controller calculates a positive compensation feeding amount based on the negative difference, and outputs an adjustment signal to the adjustment shaft 18 based on the calculated positive compensation feeding amount, and the adjustment shaft 18 moves towards the polishing wheel 10 based on the adjustment signal so as to drive the polished workpiece 11 to move towards the polishing wheel 10 to adjust a relative position between the polishing wheel 10 and the polished workpiece 11. In the process when the adjustment shaft 18 drives the polished workpiece 11 to move, the pressure F between the polishing wheel 10 and the polished workpiece 11 increases gradually, and the actual moment M1 generated by this pressure F on the detection shaft 13 increases gradually until it reaches the preset moment M0, i.e., moment M1 reaches 5%.

It is also supposed that the preset moment M0 is 5%, and pressure F between a polishing wheel 10 and a polished workpiece 11 in the polishing process is F1, then according to pressure F=F1, the detection shaft 13 detects that the moment M3 generated on the detection shaft 13 by the pressure F1 between the polishing wheel 10 and the polished workpiece 11 is 6%. The controller compares moment M3=6% detected by the detection shaft 13 with a preset moment M0=5% and determines that there is a positive difference between them, so the controller calculates a negative compensation feeding amount based on the positive difference, and outputs an adjustment signal to the adjustment shaft 18 based on the calculated negative compensation feeding amount, and the adjustment shaft 18 moves away from the polishing wheel 10 based on the adjustment signal so as to drive the polished workpiece 11 to move away from the polishing wheel 10 to adjust a relative position between the polishing wheel 10 and the polished workpiece 11. In the process when the adjustment shaft 18 drives the polished workpiece 11 to move, the pressure F1 between the polishing wheel 10 and the polished workpiece 11 decreases gradually, and the actual moment M3 generated by this pressure F1 on the detection shaft 13 decreases gradually until it reaches the preset moment M0, i.e., moment M3 reaches 5%.

Embodiment 3

Figure 7:
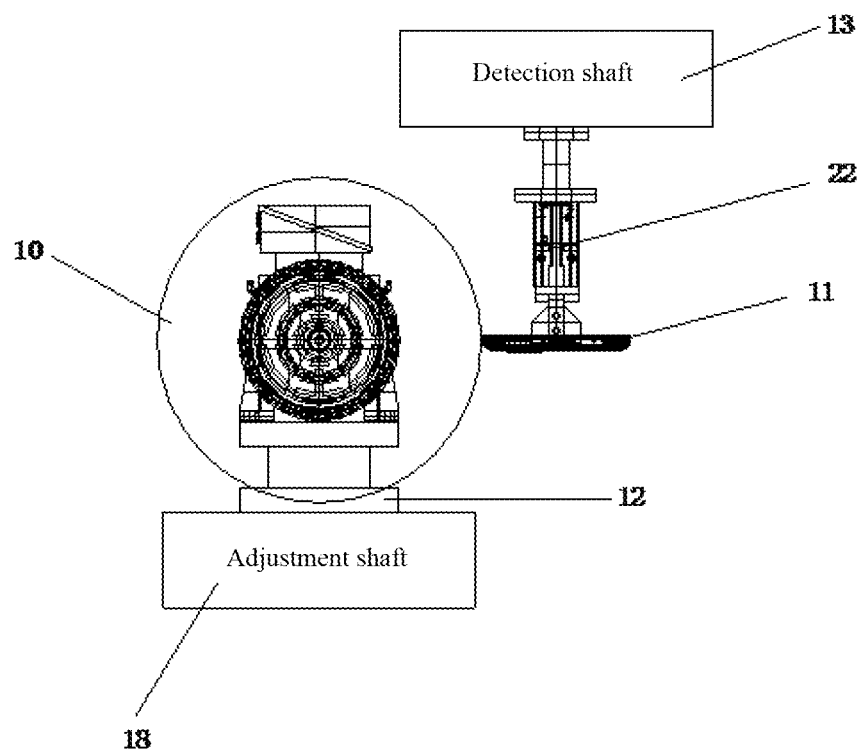
FIG. 7 is a schematic view of the positions of a polishing wheel, a detection shaft, an adjustment shaft and a polished workpiece provided by the third embodiment of the present invention.

As shown in FIG. 7, this embodiment has the following difference from the first embodiment: a substrate 12 of a polishing wheel 10 is fixed to a adjustment shaft 18, i.e., a polishing wheel 10 is fixed to an adjustment shaft 18. A polishing position 22 is fixed to a detection shaft 13, i.e., a polished workpiece 11 is fixed to a detection shaft 13. The center of the polished workpiece 11 and the center of the detection shaft 13 are on a same vertical plane. The detection shaft 13 detects the pressure or moment between a polishing wheel 10 and polished workpiece 11 according to a principle same as adopted in the first embodiment, so it is not described again. Below this embodiment is illustrated in two examples. The first, the difference determined by the controller is a positive difference, and the second, the difference determined by the controller is a negative difference.

Still a detection shaft's 13 detection of a moment generated on the detection shaft 13 by a pressure between a polishing wheel 10 and a polished workpiece 11 is taken as example. Supposing the preset moment M0 is 5%, and the pressure F between a polishing wheel 10 and a polished workpiece 11 before contact is 0, then according to pressure F=0, the detection shaft 13 detects that the moment M1 generated on the detection shaft 13 by the pressure between the polishing wheel 10 and the polished workpiece 11 is 0. The controller compares moment M1=0 detected by the detection shaft 13 with a preset moment M0=5%, and determines that there is a negative difference between them, so the controller calculates a positive compensation feeding amount based on the negative difference, and outputs an adjustment signal to the adjustment shaft 18 based on the calculated positive compensation feeding amount, and the adjustment shaft 18 moves towards the polished workpiece 11 based on the adjustment signal so as to drive the polishing wheel 10 to move towards the polished workpiece 11 to adjust a relative position between the polishing wheel 10 and the polished workpiece 11. In the process when the adjustment shaft 18 drives the polishing wheel 10 to move, the pressure F between the polishing wheel 10 and the polished workpiece 11 increases gradually, and the actual moment M1 generated by this pressure F on the detection shaft 13 increases gradually until it reaches the preset moment M0, i.e., moment M1 reaches 5%.

It is also supposed that the preset moment M0 is 5%, and pressure F between a polishing wheel 10 and a polished workpiece 11 in the polishing process is F1, then according to pressure F=F1, the detection shaft 13 detects that the moment M3 generated on the detection shaft 13 by the pressure F1 between the polishing wheel 10 and the polished workpiece 11 is 6%. The controller compares moment M3=6% detected by the detection shaft 13 with a preset moment M0=5% and determines that there is a positive difference between them, so the controller calculates a negative compensation feeding amount based on the positive difference, and outputs an adjustment signal to the adjustment shaft 18 based on the calculated negative compensation feeding amount, and the adjustment shaft 18 moves away from the polished workpiece 11 based on the adjustment signal so as to drive the polishing wheel 10 to move away from the polished workpiece 11 to adjust a relative position between the polishing wheel 10 and the polished workpiece 11. In the process when the adjustment shaft 18 drives the polishing wheel 10 to move, the pressure F1 between the polishing wheel 10 and the polished workpiece 11 decreases gradually, and the moment M3 generated by this pressure F1 on the detection shaft 13 decreases gradually until it reaches the preset moment M0, i.e., moment M3 reaches 5%.

Embodiment 4

Figure 8:
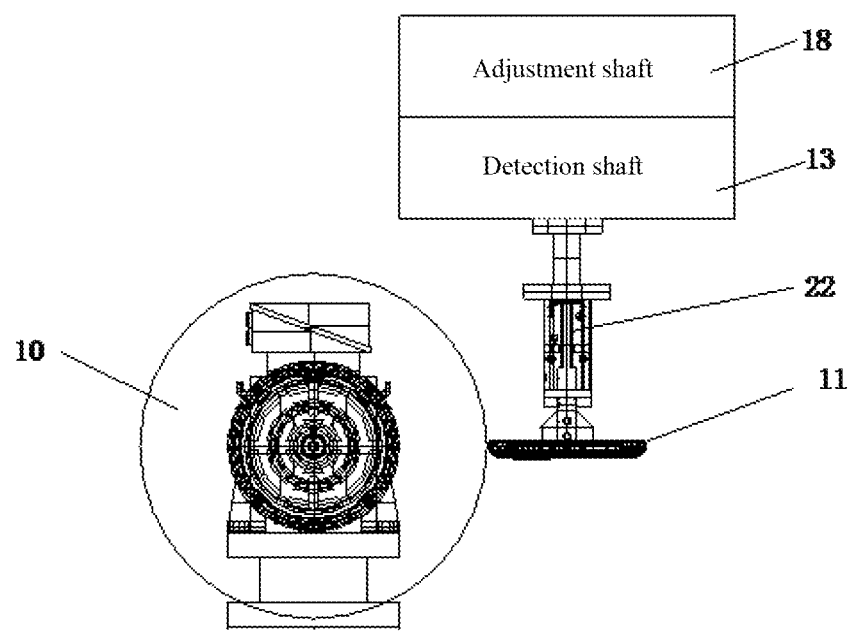
FIG. 8 is a schematic view of the positions of a polishing wheel, a detection shaft, an adjustment shaft and a polished workpiece provided by the fourth embodiment of the present invention.

As shown in FIG. 8, this embodiment has the following difference from the first embodiment: a polishing position 22 is fixed to a detection shaft 13, i.e. a polished workpiece 11 is fixed to a detection shaft 13, and the center of the polished workpiece 11 and the center of the detection shaft 13 are on a same vertical plane. A detection shaft 13 is fixed to an adjustment shaft 18. The detection shaft 13 detects the pressure between a polishing wheel 10 and polished workpiece 11 or detects the moment generated on the detection shaft 13 by the pressure between a polishing wheel 10 and polished workpiece 11 according to a principle same as adopted in the first embodiment, so it is not described again. Below this embodiment is illustrated in two examples. The first, the difference determined by the controller is a positive difference, and the second, the difference determined by the controller is a negative difference.

Still a detection shaft's 13 detection of a moment generated on the detection shaft 13 by a pressure between a polishing wheel 10 and a polished workpiece 11 is taken as example. Supposing the preset moment M0 is 5%, and the pressure F between a polishing wheel 10 and a polished workpiece 11 before contact is 0, then according to pressure F=0, the detection shaft 13 detects that the moment M1 generated on the detection shaft 13 by the pressure between the polishing wheel 10 and the polished workpiece 11 is 0. The controller compares moment M1=0 detected by the detection shaft 13 with a preset moment M0=5%, and determines that there is a negative difference between them, so the controller calculates a positive compensation feeding amount based on the negative difference, and outputs an adjustment signal to the adjustment shaft 18 based on the calculated positive compensation feeding amount, and the adjustment shaft 18 moves towards the polishing wheel 10 based on the adjustment signal so as to drive the polished workpiece 11 to move towards the polishing wheel 10 to adjust a relative position between the polishing wheel 10 and the polished workpiece 11. In the process when the adjustment shaft 18 drives the polished workpiece 11 to move, the pressure F between the polishing wheel 10 and the polished workpiece 11 increases gradually, and the actual moment M1 generated by this pressure F on the detection shaft 13 increases gradually until it reaches the preset moment M0, i.e., moment M1 reaches 5%.

It is also supposed that the preset moment M0 is 5%, and pressure F between a polishing wheel 10 and a polished workpiece 11 in the polishing process is F1, then according to pressure F=F1, the detection shaft 13 detects that the moment M3 generated on the detection shaft 13 by pressure F1 between the polishing wheel 10 and the polished workpiece 11 is 6%. The controller compares moment M3=6% detected by the detection shaft 13 with a preset moment M0=5% and determines that there is a positive difference between them, so the controller calculates a negative compensation feeding amount based on the positive difference, and outputs an adjustment signal to the adjustment shaft 18 based on the calculated negative compensation feeding amount, and the adjustment shaft 18 moves away from the polishing wheel 10 based on the adjustment signal so as to drive the polished workpiece 11 to move away from the polishing wheel 10 to adjust a relative position between the polishing wheel 10 and the polished workpiece 11. In the process when the adjustment shaft 18 drives the polished workpiece 11 to move, the pressure F1 between the polishing wheel 10 and the polished workpiece 11 decreases gradually, and the moment M3 generated by this pressure F1 on the detection shaft 13 decreases gradually until it reaches the preset moment M0, i.e., moment M3 reaches 5%.

To sum up, by applying the lever principle, the present invention uses a detection shaft 13 to detect the pressure between a polishing wheel 10 and a polished workpiece 11 or detect the moment generated on the detection shaft 13 by the pressure between a polishing wheel 10 and a polished workpiece 11, uses a controller to control pressure or moment and uses an adjustment shaft 18 to automatically compensate the pressure between the polishing wheel 10 and the polished workpiece 11. When the rotation speed of the polishing wheel 10 is constant, the present invention realizes stable pressure between the polishing wheel 10 and the polished workpiece 11 in the polishing process and may also realize automatic compensation in the polishing process when the polishing wheel 10 is worn, thereby guaranteeing stable and consistent machining quality of polished workpieces 11 and meeting the requirements for high accuracy and high efficiency.

The foregoing embodiments only represent the preferred embodiments of the present invention. Their descriptions are concrete and detailed, but they shall not be therefore understood as limitations to the scope of the present invention patent. It shall be noted that for those skilled in the art, various changes and modifications may be made to the embodiments without departing from the spirit of the present invention, such as: combinations of different features of the embodiments. All these shall be in the protective scope of the present invention.

The invention claimed is:

1. A method for detecting, controlling and automatically compensating pressure in a polishing process, wherein it comprises the following steps:
   detecting a pressure between a polishing wheel and a polished workpiece by a detection shaft in a direction of force, and outputting the detected pressure to a controller;
   comparing by the controller the pressure detected by the detection shaft with a preset pressure and determining whether there is a difference between them, and if there is not a difference, repeating the last step, or if there is a difference, carrying out a next step;
   calculating by the controller a compensation feeding amount based on the difference and outputting an adjustment signal to an adjustment shaft based on the compensation feeding amount;
   moving the adjustment shaft correspondingly based on the adjustment signal so as to drive the polishing wheel or the polished workpiece to move correspondingly to adjust a relative position between the polishing wheel and the polished workpiece so that the pressure between the polishing wheel and the polished workpiece generated on the detection shaft by the pressure between the polishing wheel and the polished workpiece tends to be and keeps consistent with the preset pressure; and
   in the polishing process, continuously repeating the foregoing steps to keep the pressure between the polishing wheel and the polished workpiece constant all the time,
   wherein an axis of rotation of the polishing wheel is horizontal and a center of the workpiece is on a same horizontal line with a center of the polishing wheel, the detection shaft is mounted along a direction that is parallel to the direction of the pressure applied by the polishing wheel on the workpiece, and a force sensor is mounted at an end of the detection shaft.

2. The method for detecting, controlling and automatically compensating pressure in a polishing process according to claim 1, wherein the difference comprises a positive difference and a negative difference.

3. The method for detecting, controlling and automatically compensating pressure in a polishing process according to claim 2, wherein the polishing wheel is fixed to the detection shaft, and the detection shaft is fixed to the adjustment shaft.

4. The method for detecting, controlling and automatically compensating pressure in a polishing process according to claim 3, wherein if the controller determines that there is a positive difference between them, the controller calculates a negative compensation feeding amount based on the positive difference, and outputs the adjustment signal to the adjustment shaft based on the calculated negative compensation feeding amount, and the adjustment shaft moves away from the polished workpiece based on the adjustment signal so as to drive the polishing wheel to move away from the polished workpiece to adjust the relative position between the polishing wheel and the polished workpiece.

5. The method for detecting, controlling and automatically compensating pressure in a polishing process according to claim 3, wherein if the controller determines that there is a negative difference between them, the controller calculates a positive compensation feeding amount based on the negative difference, and outputs the adjustment signal to the adjustment shaft based on the calculated positive compensation feeding amount, and the adjustment shaft moves towards the polished workpiece based on the adjustment signal so as to drive the polishing wheel to move towards the polished workpiece to adjust the relative position between the polishing wheel and the polished workpiece.

6. The method for detecting, controlling and automatically compensating pressure in a polishing process according to claim 2, wherein the polishing wheel is fixed to the detection shaft, and the polished workpiece is fixed to the adjustment shaft.

7. The method for detecting, controlling and automatically compensating pressure in a polishing process according to claim 6, wherein if the controller determines that there is a positive difference between them, the controller calculates a negative compensation feeding amount based on the positive difference, and outputs the adjustment signal to the adjustment shaft based on the calculated negative compensation feeding amount, and the adjustment shaft moves away from the polishing wheel based on the adjustment signal so as to drive the polished workpiece to move away from the polishing wheel to adjust the relative position between the polishing wheel and the polished workpiece.

8. The method for detecting, controlling and automatically compensating pressure in a polishing process according to claim 6, wherein if the controller determines that there is a negative difference between them, the controller calculates a positive compensation feeding amount based on the negative difference, and outputs the adjustment signal to the adjustment shaft based on the calculated positive compensation feeding amount, and the adjustment shaft moves towards the polishing wheel based on the adjustment signal so as to drive the polished workpiece to move towards the polishing wheel to adjust the relative position between the polishing wheel and the polished workpiece.

9. The method for detecting, controlling and automatically compensating pressure in a polishing process according to claim 2, wherein the polishing wheel is fixed to the adjustment shaft, the polished workpiece is fixed to the detection shaft.

10. The method for detecting, controlling and automatically compensating pressure in a polishing process according to claim 9, wherein if the controller determines that there is a positive difference between them, the controller calculates a negative compensation feeding amount based on the positive difference, and outputs the adjustment signal to the adjustment shaft based on the calculated negative compensation feeding amount, and the adjustment shaft moves away from the polished workpiece based on the adjustment signal so as to drive the polishing wheel to move away from the polished workpiece to adjust the relative position between the polishing wheel and the polished workpiece.

11. The method for detecting, controlling and automatically compensating pressure in a polishing process according to claim 9, wherein if the controller determines that there is a negative difference between them, the controller calculates a positive compensation feeding amount based on the negative difference, and outputs the adjustment signal to the adjustment shaft based on the calculated positive compensation feeding amount, and the adjustment shaft moves towards the polished workpiece based on the adjustment signal so as to drive the polishing wheel to move towards the polished workpiece to adjust the relative position between the polishing wheel and the polished workpiece.

12. The method for detecting, controlling and automatically compensating pressure in a polishing process according to claim 2, wherein the polished workpiece is fixed to the detection shaft, the detection shaft is fixed to the adjustment shaft.

13. The method for detecting, controlling and automatically compensating pressure in a polishing process according to claim 12, wherein if the controller determines that there is a positive difference between them, the controller calculates a negative compensation feeding amount based on the positive difference, and outputs the adjustment signal to the adjustment shaft based on the calculated negative compensation feeding amount, and the adjustment shaft moves away from the polishing wheel based on the adjustment signal so as to drive the polished workpiece to move away from the polishing wheel to adjust the relative position between the polishing wheel and the polished workpiece.

14. The method for detecting, controlling and automatically compensating pressure in a polishing process according to claim 12, wherein if the controller determines that there is a negative difference between them, the controller calculates a positive compensation feeding amount based on the negative difference, and outputs the adjustment signal to the adjustment shaft based on the calculated positive compensation feeding amount, and the adjustment shaft moves towards the polishing wheel based on the adjustment signal so as to drive the polished workpiece to move towards the polishing wheel to adjust the relative position between the polishing wheel and the polished workpiece.

* * * * *